United States Patent
Takagi

(10) Patent No.: US 10,802,197 B2
(45) Date of Patent: Oct. 13, 2020

(54) LIGHT GUIDE PLATE, DISPLAY APPARATUS, AND GAME MACHINE

(71) Applicant: Omron Corporation, Kyoto (JP)

(72) Inventor: Yoshihiko Takagi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/340,238

(22) PCT Filed: Sep. 15, 2017

(86) PCT No.: PCT/JP2017/033581
§ 371 (c)(1),
(2) Date: Apr. 8, 2019

(87) PCT Pub. No.: WO2018/092402
PCT Pub. Date: May 24, 2018

(65) Prior Publication Data
US 2020/0041714 A1     Feb. 6, 2020

(30) Foreign Application Priority Data
Nov. 18, 2016  (JP) ................................ 2016-225155

(51) Int. Cl.
*F21V 8/00* (2006.01)
*A63F 7/02* (2006.01)

(52) U.S. Cl.
CPC ............ *G02B 6/0036* (2013.01); *A63F 7/027* (2013.01); *G02B 6/0061* (2013.01)

(58) Field of Classification Search
CPC .. G02B 6/0036; G02B 6/0061; G02B 6/0058; A63F 7/027; A63F 7/02; G09F 13/20; G09F 13/18; F21S 2/00
See application file for complete search history.

(56) References Cited

U.S. PATENT DOCUMENTS 9,091,411 B2 * 7/2015 Huang ...................... F21V 7/04
2015/0092444 A1   4/2015 Takagi et al.
(Continued)

FOREIGN PATENT DOCUMENTS

JP    2015-88489 A  *  5/2015
JP    2015-88489 A     5/2015
(Continued)

OTHER PUBLICATIONS

International Search Report issued in Application No. PCT/JP2017/033581, dated Dec. 5, 2017 (2 pages).
(Continued)

*Primary Examiner* — Jeffrey S Vanderveen
(74) *Attorney, Agent, or Firm* — Osha Liang LLP

(57) ABSTRACT

A light guide plate is transparent to visible light and is formed into a plate shape. The light guide plate includes a plurality of prisms 21 provided in a first region 22 on one surface 2b of the light guide plate, each of the plurality of prisms 21 including a reflection surface 21a that reflects the visible light, which is emitted from the light source 3 and enters the light guide plate 2 through an incoming surface 2a, toward the other surface 2c of the light guide plate 2. Then, for each of a plurality of first partial regions (22-1 to 22-n) in the first region 22, at least one of a direction of the reflection surface 21a of each prism 21 arranged in the first partial region and a ratio of a total of areas of the reflection surfaces 21a of each prism 21 to the first partial region is set according to an amount of light traveling from the first partial region toward a predetermined viewpoint such that brightness of the first region 22 changes spatially irregularly as seen from the predetermined viewpoint.

11 Claims, 9 Drawing Sheets

(56) References Cited

U.S. PATENT DOCUMENTS

| | | |
|---|---|---|
| 2015/0131316 A1 | 5/2015 | Takagi et al. |
| 2015/0168627 A1 | 6/2015 | Takagi et al. |
| 2017/0248749 A1 | 8/2017 | Fujita et al. |
| 2017/0285245 A1 | 10/2017 | Fujita et al. |
| 2018/0182201 A1 | 6/2018 | Fujita et al. |

FOREIGN PATENT DOCUMENTS

| | | | | |
|---|---|---|---|---|
| JP | 2015-94833 A | | 5/2015 | |
| JP | 201594833 A | * | 5/2015 | |
| JP | 2015-118128 A | | 6/2015 | |
| JP | 2015118128 A | * | 6/2015 | ............ G02B 6/006 |
| JP | 2016-18194 A | * | 2/2016 | |
| JP | 2016-18194 A | | 2/2016 | |
| JP | 2016-122171 A | | 7/2016 | |
| JP | 2017-107048 A | | 6/2017 | |
| KR | 10-2007-0117401 A | | 12/2007 | |
| WO | 2016/103920 A1 | | 6/2016 | |
| WO | WO2016103920 A | * | 6/2016 | |

OTHER PUBLICATIONS

Written Opinion issued in International Application No. PCT/JP2017/033581, dated Dec. 5, 2017 (22 pages).

\* cited by examiner

LIGHT GUIDE PLATE, DISPLAY APPARATUS, AND GAME MACHINE

TECHNICAL FIELD

The present invention relates to a light guide plate and a display apparatus for displaying a pattern that looks shiny and a game machine including the display apparatus.

BACKGROUND ART

Conventionally, there has been proposed a technique of displaying a pattern that looks shiny using a light guide plate, which has optical transparency and is formed into a plate shape. With this technique, various devises are made to improve presence of an observer (for example, see Patent Documents 1 and 2).

For example, in the light guide disclosed in Patent Document 1, a plurality of reflection patterns are formed in a reflection region that is a region corresponding to a light emitting area on the surface opposed to the light outgoing surface in order to allow the observer to three-dimensionally visually recognize the light emitting area. Each reflection pattern is arranged such that an amount of light, which is output from the light emitting area while reflected by the reflection pattern and reaches the observer who observes the light outgoing surface, continuously changes according to a position in the light emitting area.

In the light guide plate disclosed in Patent Document 2, a plurality of prisms that reflect the light incoming along a predetermined pattern toward the outgoing surface are arrayed on a diffusion surface of the light guide plate in order to reduce a difference in luminance depending on a viewing direction of the pattern that looks shiny. The plurality of prisms are arranged such that the reflection surfaces of the two prisms separated by a predetermined pitch are oriented in an identical direction, and such that the reflection surfaces of the two prisms that are closer than the predetermined pitch are oriented in mutually different directions.

PRIOR ART DOCUMENTS

Patent Documents

Patent Document 1: Japanese Unexamined Patent Publication No. 2015-88489
Patent Document 2: Japanese Unexamined Patent Publication No. 2016-122171

SUMMARY OF THE INVENTION

Problems to be Solved by the Invention

In the technique disclosed in Patent Document 1 and the technique disclosed in Patent Document 2, luminance of the portion that looks shiny due to a change in position on an outgoing surface is not largely changed. However, in order to improve the presence of the observer, there is also a demand that the portion that looks shiny is seen so as not to be expressed by the techniques.

An object of the present invention is to provide a light guide plate capable of improving the presence of the observer.

Means for Solving the Problem

According to one aspect of the present invention, a light guide plate that is transparent to visible light and is formed into a plate shape is provided. The light guide plate includes: an incoming surface opposed to a light source that emits the visible light; and a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate. For each of a plurality of first partial regions in the first region, at least one of a direction of the reflection surface of each prism arranged in the first partial region and a ratio of a total of areas of the reflection surface to the first partial region is set according to an amount of light traveling from the first partial region toward a predetermined viewpoint such that brightness of the first region changes spatially irregularly as seen from the predetermined viewpoint.

In the light guide plate, preferably for each of the plurality of first partial regions, an angle along the one surface of the reflection surface with respect to a direction in which the reflection surface of each prism arranged in the first partial region and the light source directly face each other is set so as to become the direction of the reflection surface according to the amount of light traveling from the first partial region toward the predetermined viewpoint.

In the light guide plate, preferably for each of the plurality of first partial regions, an inclination angle of the reflection surface of each prism arranged in the first partial region with respect to the one surface is set so as to become the direction of the reflection surface according to the amount of light traveling from the first partial region toward the predetermined viewpoint.

In the light guide plate, preferably for each of the plurality of first partial regions, a number of prisms arranged in the first partial region is set to the ratio of the total of the areas of the reflection surface according to the amount of light traveling from the first partial region toward the predetermined viewpoint.

In the light guide plate, preferably for each of the plurality of first partial regions, a size of the reflection surface of each prism arranged in the first partial region is set to the ratio of the total of the areas of the reflection surface according to the amount of light traveling from the first partial region toward the predetermined viewpoint.

Preferably the light guide plate further includes a plurality of prisms provided in a second region different from the first region on the one surface of the light guide plate, each of the plurality of prisms including a reflection surface that reflects the visible light, which is emitted from the light source and enters the light guide plate through the incoming surface, toward the other surface of the light guide plate. In this case, preferably for each of a plurality of second partial regions in the second region, at least one of a direction of the reflection surface of each prism arranged in the second partial region and a ratio of a total of areas of the reflection surface to the second partial region is set according to the amount of light traveling from the second partial region toward the predetermined viewpoint such that brightness of the second region changes in a gradation manner along at least one of directions as seen from the predetermined viewpoint.

In this case, preferably for each of the plurality of first partial regions, the direction of the reflection surface of each prism arranged in the first partial region is set according to the amount of light traveling from the first partial region toward the predetermined viewpoint, and for each of the plurality of second partial regions, the ratio of the total of the areas of the reflection surface of the second partial region is set according to the amount of light traveling from the second partial region toward the predetermined viewpoint.

In another aspect of the present invention, a display apparatus is provided. This display apparatus includes: a light source configured to emit visible light; a light guide plate that is transparent to the visible light and is formed into a plate shape; and a controller configured to control turning on and off of the light source. The light guide plate includes: an incoming surface opposed to the light source; and a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate. For each of a plurality of first partial regions in the first region, at least one of a direction of the reflection surface of each prism arranged in the first partial region and a ratio of a total of areas of the reflection surface to the first partial region is set according to an amount of light traveling from the first partial region toward a predetermined viewpoint such that brightness of the first region changes spatially irregularly as seen from the predetermined viewpoint.

In this display apparatus, preferably the light source includes a plurality of light emitting elements arrayed along a longitudinal direction of the incoming surface, and the controller changes the light emitting element to be lit among the plurality of light emitting elements with lapse of time.

In this display apparatus, preferably for each of the plurality of first partial regions, an angle along the one surface of the reflection surface of each prism arranged in the first partial region with respect to a predetermined direction along the one surface is set so as to become the direction of the reflection surface according to the amount of light traveling from the first partial region toward the predetermined viewpoint.

According to still another aspect of the present invention, a game machine is provided. The game machine includes: a game machine body; and a display apparatus provided on a surface of the game machine body on a side opposed to a player, and the display apparatus includes: a light source configured to emit visible light; a light guide plate that is transparent to the visible light and is formed into a plate shape; and a controller configured to control turning on and off of the light source.

The light guide plate includes: an incoming surface opposed to the light source; and a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate. For each of a plurality of first partial regions in the first region, at least one of a direction of the reflection surface of each prism arranged in the first partial region and a ratio of a total of areas of the reflection surface of each prism to the first partial region is set according to an amount of light traveling from the first partial region toward a predetermined viewpoint such that brightness of the first region changes spatially irregularly as seen from the predetermined viewpoint.

Effect of the Invention

The light guide plate according to the present invention has the effect that the presence of the observer can be improved.

MODE FOR CARRYING OUT THE INVENTION

Hereinafter, a display apparatus according to an embodiment of the present invention will be described with reference to the drawings. The display apparatus includes a light guide plate in which a material transparent to visible light is formed into a plate shape, and one of surfaces of the light guide plate is formed as an outgoing surface facing an observer. A plurality of prisms that reflect the visible light, which is emitted from a light source and enters the light guide plate through an incoming surface formed on the sidewall of the light guide plate, toward the outgoing surface are formed in a light emitting region where a pattern seen to be shiny from the observer is displayed on a diffusion surface, which is the other surface of the light guide plate and is opposed to the outgoing surface. The light emitting region is divided into a plurality of partial regions. At least one of a direction of a reflection surface of each prism included in the partial region and a ratio of a total of reflection surface areas of the prisms to each partial region is set in each partial region according to an amount of light traveling from the partial region to a predetermined viewpoint such that brightness in the light emitting region spatially irregularly changes as seen from the predetermined viewpoint. Consequently, the display apparatus exhibits the light emitting region to the observer such that the light emitting region looks like shining, namely, the display apparatus gives a sparkling feeling to the observer, which allows presence of the observer to be improved.

Figure 1:
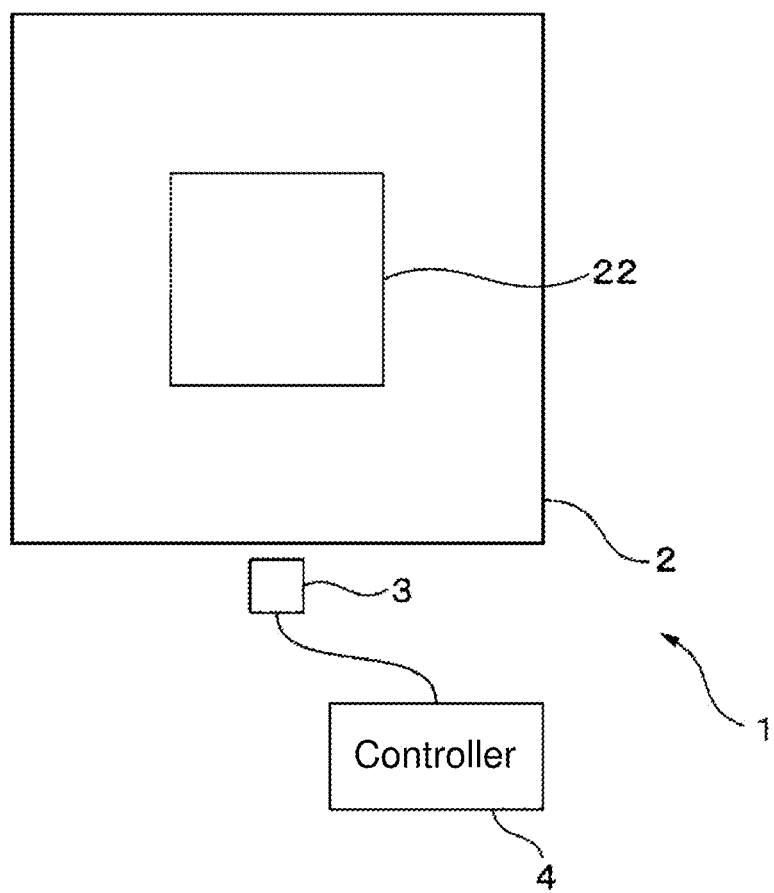
FIG. 1 is a schematic configuration diagram illustrating a display apparatus according to a first embodiment of the present invention.

FIG. 1 is a schematic configuration diagram illustrating a display apparatus according to a first embodiment of the present invention. A display apparatus 1 includes a light guide plate 2, a light source 3, and a controller 4.

The light guide plate 2 is a member formed into a flat plate shape transparent to the visible light emitted from the light source 3. The light guide plate 2 is formed by molding a resin, such as polymethyl methacrylate (PMMA), polycarbonate, and cycloolefin polymer, which is transparent to the visible light. The light guide plate 2 propagates the light from the light source 3 in the light guide plate 2 while the light source 3 is turned on, and the light from the light source 3 is reflected toward the observer located on the front side of the light guide plate 2 by the diffusion surface that is not opposed to the observer, namely, by the plurality of prisms formed in a light emitting region 22 on the rear surface side, which allows the observer to visually recognize the shining pattern.

Details of the light guide plate 2 will be described later.

The light source 3 includes at least one light emitting element that emits the visible light, and is arranged such that a light emitting surface of the light emitting element is opposed to an incoming surface 2a that is one of sidewalls of the light guide plate 2. The light source 3 is turned on or off in response to a control signal from the controller 4. While the controller 4 turns on the light source 3, the light emitted from the light source 3 enters the light guide plate 2 through the incoming surface 2a, propagates in the light guide plate 2 while traveling straight or being totally reflected, is reflected by the plurality of prisms formed on a diffusion surface 2b on the rear surface side of the light guide plate 2, and is output from an outgoing surface 2c on the front side.

For example, the light emitting element included in the light source 3 is a light emitting diode, an incandescent lamp, a fluorescent lamp, or an organic EL element.

For example, the controller 4 includes a processor, a memory circuit, and a drive circuit of the light source 3. The controller 4 controls the turning on and off of the light source 3 in response to a control signal from a higher-level control apparatus (not illustrated). The controller 4 turns on the light source 3 in the case that the observer located on the front side of the light guide plate 2 can see a pattern of the light emitting region 22, and the controller 4 turns off the light source 3 in order that the observer cannot see the pattern of the light emitting region 22.

Details of the light guide plate 2 will be described below.

Figure 2:
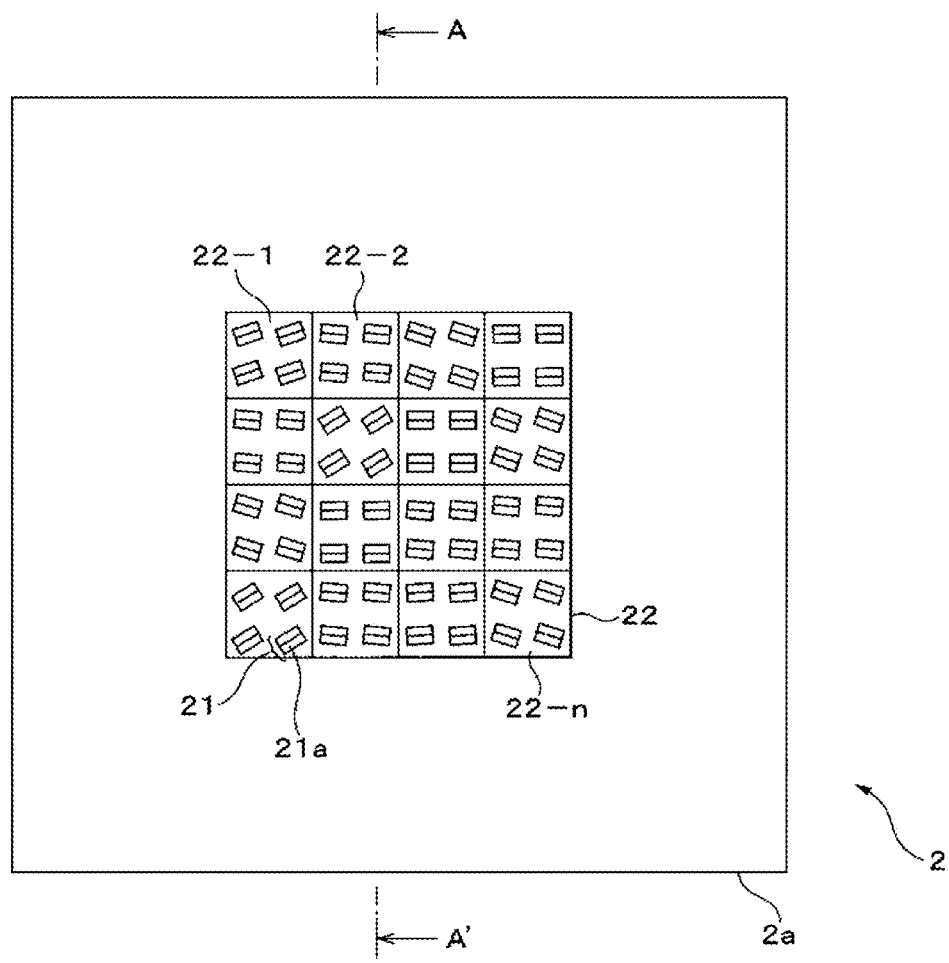
FIG. 2 is a schematic front view illustrating a light guide plate included in the display apparatus.
Figure 3:
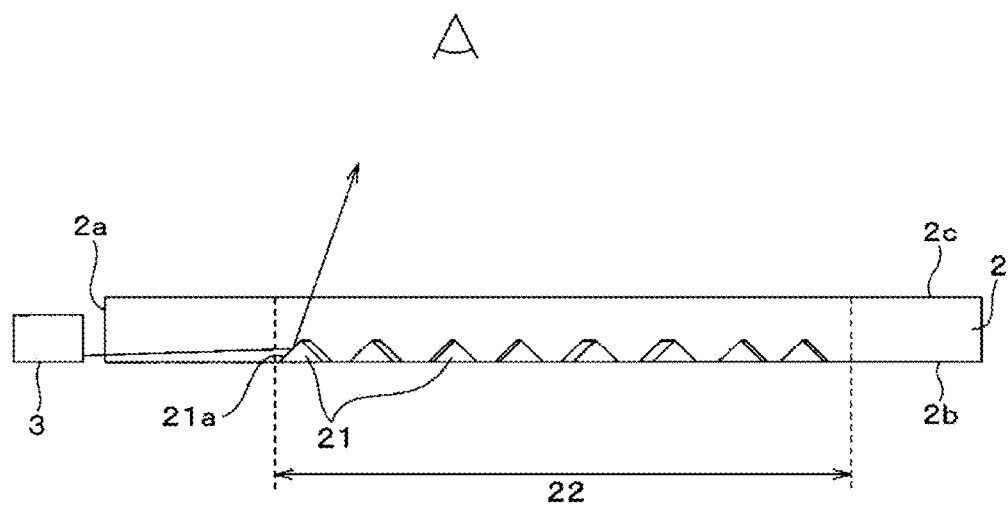
FIG. 3 is a schematic sectional side view illustrating the light guide plate taken along line A-A' in FIG. 2.

FIG. 2 is a schematic front view of the light guide plate 2. FIG. 3 is a schematic sectional side view illustrating the light guide plate 2 taken along line A-A' in FIG. 2. As illustrated in FIGS. 2 and 3, the incoming surface 2a opposed to the light source 3 is formed on one of the sidewalls of the light guide plate 2. The light emitted from the light source 3 enters the light guide plate 2 through the incoming surface 2a. The light propagates in the light guide plate 2 while being totally reflected between the diffusion surface 2b and the outgoing surface 2c, or the light propagates while traveling straight is totally reflected by one of the plurality of prisms 21 formed on the diffusion surface 2b located on the rear surface side of the light guide plate 2, and the light is output from the outgoing surface 2c, which is located on the front side of the light guide plate 2 and is opposed to the diffusion surface 2b. In the first embodiment, the plurality of prisms 21 are arrayed in the light emitting region 22 where the pattern giving a sparkling feeling is formed. Thus, while the light source 3 is turned on, the observer can observe the pattern represented in the light emitting region 22 on the surface of the light guide plate 2. Although one light emitting region 22 is illustrated in FIG. 2, a plurality of light emitting regions 22 may be provided in the light guide plate 2. At this point, the light emitting regions 22 may be arranged so as to be adjacent to each other, or the light emitting regions 22 may be arranged away from each other like a checkered pattern. The light emitting regions 22 may be the same as each other. Consequently, for example, in the case that each prism 21 is formed by photolithography, a patterning mask corresponding to one light emitting region 22 may be prepared. Using the mask in each light emitting region 22, the prism 21 of each light emitting region 22 can be formed on the light guide plate 2. For this reason, a process of manufacturing the light guide plate 2 can be simplified. Alternatively, a shape and a size of each light emitting region 22 may be appropriately determined according to the pattern to be expressed. In FIGS. 2 and 3, it is noted that the size of the prism 21 and a thickness of the light guide plate 2 are exaggerated in order to improve visibility of the drawings.

The light emitting region 22 is an example of a first region, and is divided into a plurality of partial regions 22-1 to 22-n (n is an integer of 2 or more). For example, as illustrated in FIG. 2, each of the partial regions 22-1 to 22-n is a rectangular region, and the partial regions 22-1 to 22-n are arranged such that adjacent partial regions contact with each other. Alternatively, each of the partial regions 22-1 to 22-n may have a triangular shape, a pentagonal shape, or a circular shape. At least one of the partial regions 22-1 to 22-n may have a shape different from that of the other partial regions. The partial regions 22-1 to 22-n may have the same size, or at least one of the partial regions 22-1 to 22-n has a size different from that of the other partial regions. The partial regions 22-1 to 22-n may be arranged away from each other in a checkered pattern.

Preferably the size of each of the partial regions 22-1 to 22-n is greater than or equal to a minimum value of a length that can be identified by eyes of the observer.

For example, assuming that the minimum value of a viewing angle that can be identified by the observer is one minute that is the minimum value of the viewing angle of a person having visual acuity of 1.0, and that an assumed distance between the observer and the light guide plate 2 is 600 mm, preferably a length of one side of each of the partial regions 22-1 to 22-n is greater than or equal to 0.17 mm, or an area of each of the partial regions 22-1 to 22-n is greater than or equal to 0.5 $mm^2$.

At least one prism 21 is arranged in each of the partial regions 22-1 to 22-n. In each partial region, for example, each prism 21 is arranged in a lattice shape, a line shape, or a staggered shape. As described in detail later, the number of the prisms 21 arranged in each partial region may be the same as or different to one another.

Each of the plurality of prisms 21 is formed as, for example, a substantially triangular groove in the diffusion surface 2b, and one surface of the groove on the side of the light source 3 is formed as a reflection surface 21a. The reflection surface 21a of each prism 21 has a predetermined length along the diffusion surface 2b, and forms a predetermined inclination angle with respect to the diffusion surface 2b. The predetermined length is set to a length of an extent that each prism 21 cannot visually be recognized by the eyes of the observer, for example, about several micrometers to several tens of micrometers. The inclination angle is set so as to totally reflect the light which enters the light guide plate 2 from the light source 3 to form an angle directed toward the outgoing surface 2c, for example, 40° to 50° with respect to the diffusion surface 2b.

As described in detail later, the length and inclination angle of the reflection surface 21a of each prism 21 along the diffusion surface 2b may be set in each partial region.

As described in detail later, the direction from a predetermined position of the light source 3 (for example, a center of the light emitting surface of the light emitting element) to a center of the reflection surface 21a of each prism 21, namely, the rotation angle of the reflection surface 21a around a vertical direction of the diffusion surface 2b with respect to the direction directly facing the light source 3 (hereinafter, for convenience, simply referred to as rotation angle) may be set in each partial region.

In the first embodiment, in order that the light emitting region 22 looks like shining, the amount of light traveling to a predetermined viewpoint of the observer is randomly set in each partial region such that the brightness of the light emitting region 22 seen from the predetermined viewpoint spatially irregularly changes. At least one of the direction of the reflection surface 21a of each prism 21 arranged in the partial region (that is, at least one of the rotation angle and the inclination angle) and the ratio of the total of areas of the reflection surfaces 21a to each partial region is set in each partial region according to the amount of light traveling from the partial region to the predetermined viewpoint (hereinafter, for convenience, referred to as a light amount of the partial region).

The light amount of each partial region is calculated by adding a light amount change value to a minimum value of the light amount, the light amount change value being obtained by multiplying a difference between the maximum value and the minimum value of the light amounts of one partial region by a random number, which is allocated to each partial region and has a value ranging from 0 to 1. Any random number sequence may be used to determine the random number of each partial region. In the case that the light amount of each partial region is adjusted by the rotation angle of the reflection surface 21a, assuming that a clockwise direction is positive with respect to the direction directly facing the light source 3 while a counterclockwise direction is negative, whether the partial region becomes positive or negative may randomly be determined. Similarly, in the case that the light amount of each partial region is adjusted by the inclination angle of the reflection surface 21a, assuming that the case larger than the inclination angle that becomes the maximum light amount with respect to the predetermined viewpoint is positive while the case smaller than the inclination angle is negative, whether the partial region becomes positive or negative may randomly be determined.

Figure 4:
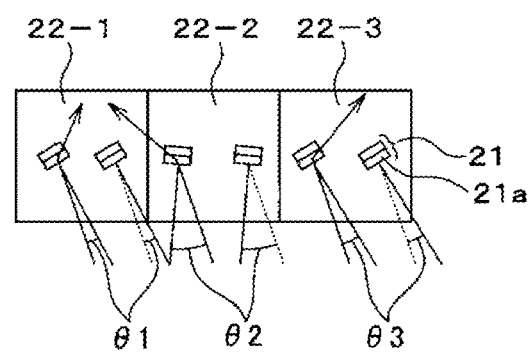
FIG. 4 is an enlarged plan view illustrating a part of a light emitting region, and illustrating arrangement of prisms when a light amount is adjusted in each partial region by a rotation angle of a reflection surface of each prism.

FIG. 4 is an enlarged plan view illustrating a part of the light emitting region 22, and illustrating arrangement of the prisms 21 when the light amount is adjusted in each partial region by the rotation angle of the reflection surface 21a of each prism 21. Three partial regions 22-1 to 22-3 are illustrated in FIG. 4.

In this example, the rotation angle of the reflection surface 21a of each prism 21 arranged in the partial region 22-1 is θ1, and the rotation angle of the reflection surface 21a of each prism 21 arranged in the partial region 22-2 is θ2, and the rotation angle of the reflection surface 21a of each prism 21 arranged in the partial region 22-3 is θ3. The rotation angles θ1, θ2, θ3 are different from one another. Consequently, because the light from the light source 3 is reflected towards a different direction for each of the partial regions 22-1 to 22-3, the direction in which the light output from the outgoing surface 2c has the highest intensity (hereinafter, for convenience, referred to as an orientation direction) varies in each partial region. As a result, the amount of light reaching a specific viewpoint varies in each of the partial regions 22-1 to 22-3. In one partial region, the direction in which the reflection surface 21a of the prism 21 directly faces the light source 3 is substantially identical irrespective of the position of the prism 21, so that the directions of the prisms 21 arranged in each partial region may be identical.

In this example, as described above, the rotation angle of the reflection surface 21a of the prism 21 in each partial region is determined according to the light amount set to the corresponding partial region. For example, for the predetermined viewpoint, it is assumed that the maximum light amount is obtained when the rotation angle is 0° and that the minimum light amount is obtained when the rotation angle is ±20°. In this case, the rotation angle in each partial region is set to the rotation angle that is closest to the light amount set to the partial region among a plurality of rotation angles set within a range of ±20° in a predetermined angle unit.

The angle between the orientation directions of the two adjacent partial regions is preferably set such that a distance between the peak positions of the light amounts from the two partial regions at the viewpoint position of the observer is greater than or equal to a half of an interval between the eyes of the observer. Consequently, the partial region where the observer feels bright changes sequentially as the viewpoint of the observer moves substantially in parallel to the outgoing surface 2c of the light guide plate 2, so that the sparkling feeling given to the observer can be improved.

For example, assuming that the distance between the light guide plate 2 and the viewpoint of the observer is 600 mm and that the distance between the eyes of the observer is 65 mm, preferably the angle between the orientation directions of the two adjacent partial regions is greater than or equal to arctan $(32.5/600) \approx 3.1°$. At this point, when the light guide plate 2 has a refractive index of about 1.5, preferably a difference in rotation angle of the prism between the two adjacent partial regions is greater than or equal to 2° in order to set the angle between the orientation directions of the two adjacent partial regions to greater than or equal to 3.1°. Thus, in this case, preferably the predetermined angle unit is set to, for example, greater than or equal to 2°. On the other hand, when the predetermined angle unit is too large, the number of steps of the orientation direction decreases in each partial region to hardly give the sparkling feeling. For this reason, when the rotation angle range is within the range of ±20° as described above, the rotation angle, namely, the orientation direction can be set at 10 stages or more by setting the predetermined angle unit to, for example, less than or equal to 4°.

The predetermined angle unit may be increased as the partial region is located farther from the light source 3. As the partial region is located farther from the light source 3, the difference of the direction in which the reflection surface 21a of the prism 21 directly faces the light source 3 decreases between the adjacent two partial regions. By setting the predetermined angle unit in this way, the decrease of the difference in light amount between the two adjacent partial regions can also be suppressed in the partial region far from the light source 3.

The range in which the rotation angle of the prism 21 can be taken in each partial region may be set based on a difference between the position directly facing the center of the reflection surface 21a of the prism 21 and the center position of the light emitting surface of the light emitting element of the light source 3 in the incoming surface 2a. This enables a proper range of the rotation angle to be set according to the size of the light emitting surface of the light emitting element included in the light source 3.

For example, in the case that the size of the light emitting element included in the light source 3 in the direction along the incoming surface 2a is 20 mm, the range of the rotation angle of the prism may be set in each partial region such that the difference between the position directly facing the center of the reflection surface 21a of the prism 21 and the center position of the light emitting surface of the light emitting element included in the light source 3 is less than or equal to ±10 mm. For example, assuming that the distance from the incoming surface 2a to the two adjacent partial regions is 75 mm, the range of the rotation angle of the prism becomes arctan (±10/75)≈±7.6°. Thus, when the predetermined angle unit is 2°, the rotation angle is set at 7 to 8 steps in this case.

Figure 5:
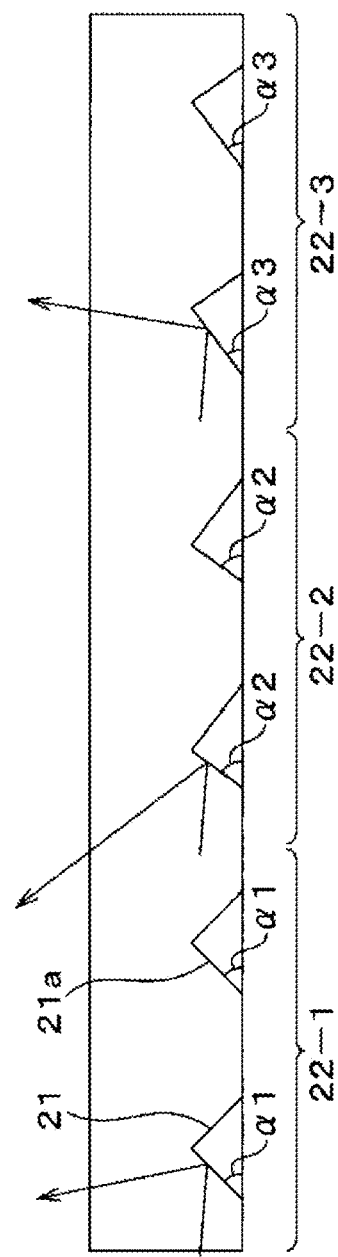
FIG. 5 is a partial side view illustrating the light guide plate corresponding to a part of the light emitting region, and illustrating the arrangement of the prisms when the light amount is adjusted in each partial region by an inclination angle of the reflection surface of each prism.

FIG. 5 is a partial side view illustrating the light guide plate 2 corresponding to a part of the light emitting region 22, and illustrating the arrangement of the prisms 21 when the light amount is adjusted in each partial region by an inclination angle of the reflection surface 21a of each prism 21. Three partial regions 22-1 to 22-3 are illustrated in FIG. 5.

In this example, the inclination angle of the reflection surface 21a of each prism 21 arranged in the partial region 22-1 is α1, the inclination angle of the reflection surface 21a of each prism 21 arranged in the partial region 22-2 is α2, and the inclination angle of the reflection surface 21a of each prism 21 arranged in the partial region 22-3 is α3. The inclination angles α1, α2, α3 are different from one another. Consequently, because the light from the light source 3 is reflected towards a different direction for each of the partial regions 22-1 to 22-3, the orientation direction varies in each partial region. As a result, the amount of light reaching the specific viewpoint varies in each partial region.

In this example, as described above, the inclination angle of the reflection surface 21a of each prism 21 in each partial region is determined according to the light amount set to the corresponding partial region. In the case that the maximum light amount is obtained with respect to the predetermined viewpoint, the inclination angle is set such that the orientation direction is directed to the predetermined viewpoint. The inclination angle is set so as to vary within a range of, for example, ±5° centered on the inclination angle in the case that the orientation direction is directed to the predetermined viewpoint.

As illustrated in FIG. 4 or 5, in the case that the light amount of each partial region is adjusted in each partial region by the rotation angle or the inclination angle of the reflection surface of the prism, the light amount of each partial region changes by changing the viewpoint position. In particular, in the case that whether the rotation angle is clockwise or counterclockwise is randomly set, or in the case that whether the inclination angle becomes small or large is randomly set, the partial region where the light amount increases and the partial region where the light amount decreases irregularly change depending on the change of the viewpoint position. Consequently, the light amount of each partial region is adjusted by adjusting the rotation angle or the inclination angle of the reflection surface of the prism in each partial region, which allows the light guide plate 2 to further improve the sparkling feeling.

Figure 6:
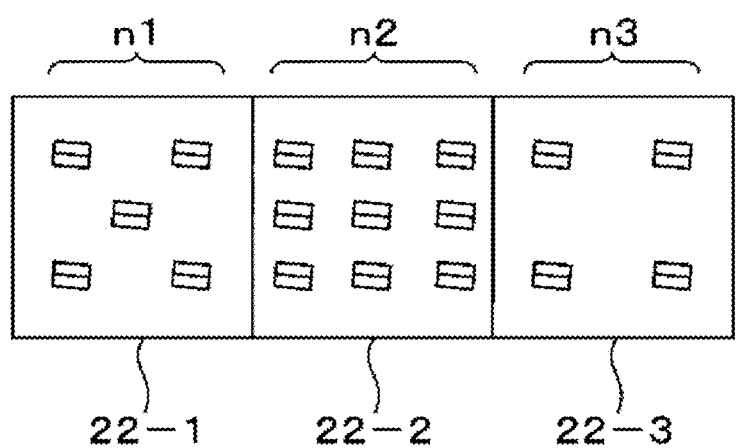
FIG. 6 is an enlarged plan view illustrating a part of the light emitting region, and illustrating the arrangement of the prisms when the light amount is adjusted in each partial region by a ratio of a total of reflection surface areas of the prisms to the partial region.

FIG. 6 is an enlarged plan view illustrating a part of the light emitting region 22, and illustrating the arrangement of the prisms 21 when the light amount is adjusted in each partial region by the ratio of the total of areas of the reflection surfaces 21a of the prisms 21 to the partial region. Three partial regions 22-1 to 22-3 are illustrated in FIG. 6. In this example, the sizes of the partial regions are identical, and the sizes of the reflection surfaces 21a of the prisms 21 are identical.

In this example, the number of the prisms 21 arranged in the partial region 22-1 is n1, the number of the prisms 21 arranged in the partial region 22-2 is n2, and the number of the prisms 21 arranged in the partial region 22-3 is n3. The numbers n1, n2 and n3 of the prisms are different from one another. As described above, the sizes of the partial regions are the same and the sizes of the reflection surfaces 21a of the prisms are the same, so that the amount of light reflected the observer side also increases in the light from the light source 3 with increasing number of prisms arranged in the partial region. For this reason, the partial region looks brighter with increasing number of prisms arranged in the partial region. Thus, the partial regions 22-1 to 22-3 are different from one another in the brightness.

Instead of changing the number of prisms according to the light amount, the size of the prism arranged in the partial region may be enlarged with increasing light amount of the partial region.

The light amount for each partial region may be adjusted by a combination of at least two of the rotation angle of the reflection surface 21a of each prism 21 arranged in the partial region, the inclination angle of the reflection surface 21a, and the ratio of the total of the areas of the reflection surfaces 21a in the partial region. In this case, for example, by uniformly allocating a decrease in light amount from the maximum light amount for each parameter (that is, the rotation angle, the inclination angle, and the ratio of the total of the areas) used in the adjustment, the light amount decreased by each parameter is determined, and each parameter may be determined according to the decreased light amount. Alternatively, the ratio of each parameter used in the adjustment to the decrease in light amount from the maximum light amount may be varied. For example, the light amount adjusted by the rotation angle may be larger than the light amount adjusted by the inclination angle or the ratio of the total of the areas.

As described above, in the display apparatus, the light emitting region forming the pattern that is displayed on the light guide plate to give the sparkling feeling is divided into the plurality of partial regions, and the light amount of each partial region is set such that the light amount reaching the predetermined viewpoint changes spatially irregularly. Then, in each partial region, at least one of the direction of the reflection surface of the prism arranged in the partial region and the ratio of the total of the reflection surface areas of the prisms to the partial region is set according to the light amount set to the partial region. Consequently, the display apparatus can give the sparkling feeling to the observer, and resultantly improve the presence of the observer.

A display apparatus according to a second embodiment will be described below. The display apparatus of the second embodiment further improves the presence given to the observer by providing a region where the light amount changes in a gradation manner as well as a region giving the sparkling feeling in a light guide plate. The display apparatus of the second embodiment is different from the display apparatus of the first embodiment in the arrangement of the prisms formed on the light guide plate. For this reason, the arrangement of the prisms formed on the light guide plate will be described below. The details of the other components of the display apparatus according to the second embodiment is referred to the description of the corresponding components of the display apparatus of the first embodiment.

Figure 7:
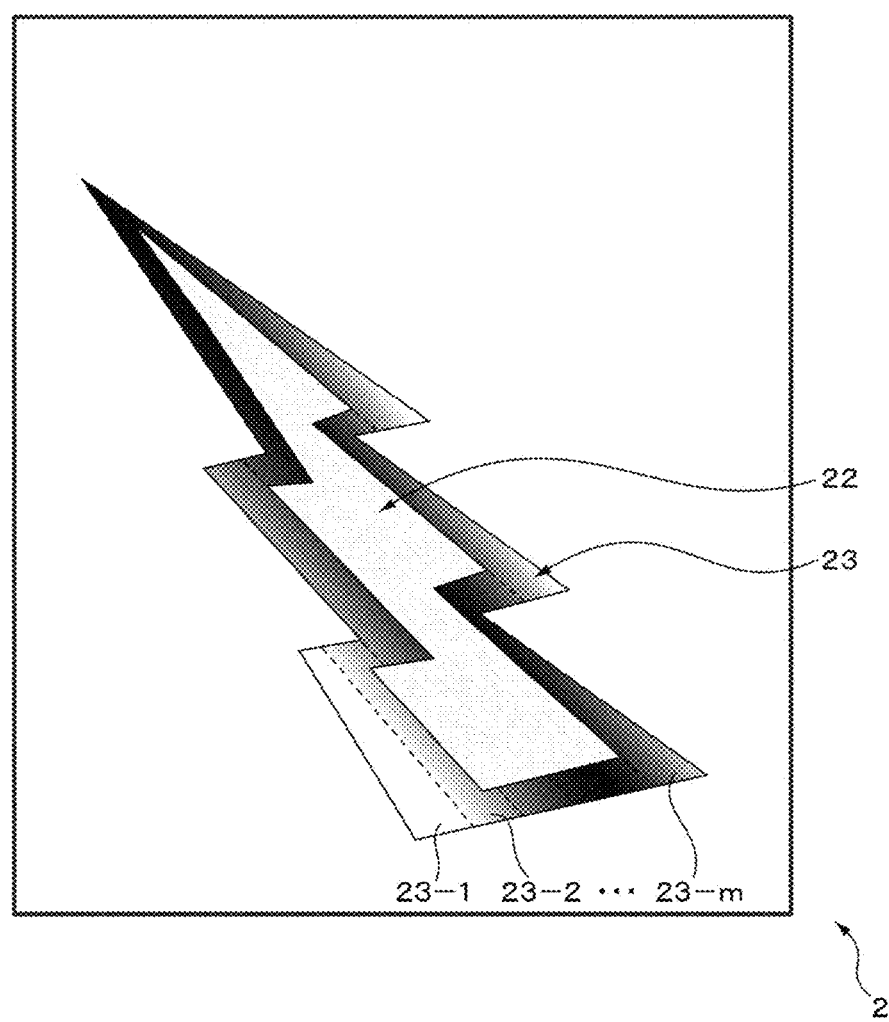
FIG. 7 is a schematic front view illustrating a light guide plate according to a second embodiment.

FIG. 7 is a schematic front view illustrating a light guide plate 2 of the second embodiment. In the light guide plate 2, a gradation region 23 where the light amount changes in a gradation manner is provided around a light emitting region 22 where the pattern giving the sparkling feeling is formed. In the gradation region 23, for example, the arrangement of the prisms arranged in the gradation region 23 is adjusted such that the light amount gradually decreases along the direction away from the light emitting region 22. One gradation region 23 may be provided, or a plurality of gradation regions 23 may be provided. gradation regions 23 may be identical to or different from one another in the size and the shape.

The gradation region 23 is an example of a second region, and is divided into a plurality of partial regions 23-1 to 23-*m* (m is an integer of 2 or more). For example, as illustrated in FIG. 7, each of the partial regions 23-1 to 23-*m* is arranged such that adjacent partial regions contact with each other. At least one of the partial regions 23-1 to 23-*m* may have a shape different from that of the other partial regions 23-1 to 23-*m*. The partial regions 23-1 to 23-*m* may have the same size, or at least one of the partial regions 23-1 to 23-*m* has a size different from that of the other partial regions 23-1 to 23-*m*.

In the second embodiment, the light guide plate 2 changes the light amount of each partial region in the gradation manner along at least one direction in order that the brightness of the gradation region 23 is seen to be changed in the gradation manner. For this reason, in each partial region, at least one of the direction (the rotation angle or the inclination angle) of the reflection surface of each prism arranged in the partial region and the ratio of the total of the reflection surface areas of the prisms to the partial region is set according to the light amount of the partial region.

Figure 8:
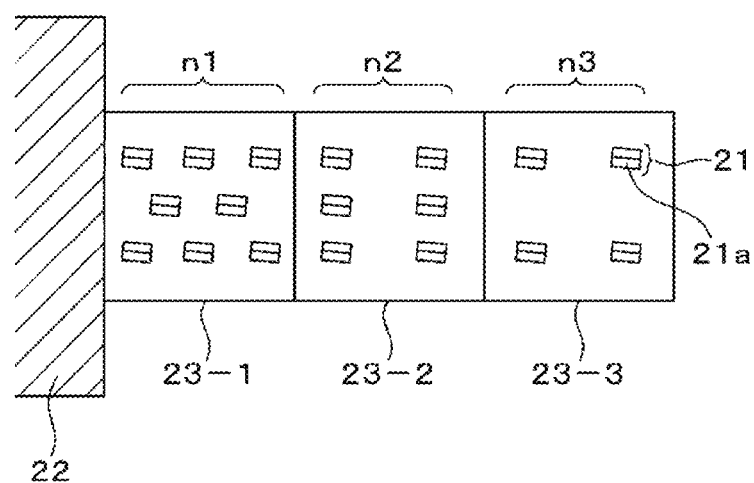
FIG. 8 is an enlarged plan view illustrating a part of a gradation region, and illustrating arrangement of prisms when a light amount is adjusted in each partial region by a ratio of a total of reflection surface areas of the prisms to the partial region.

FIG. 8 is an enlarged plan view illustrating a part of the gradation region 23, and illustrating the arrangement of the prisms 21 when the light amount is adjusted in each partial region by the ratio of the total of the areas of the reflection surfaces 21*a* of the prisms 21 to the partial region. In FIG. 8, three partial regions 23-1 to 23-3 arranged in a row are illustrated in order from the side closer to the light emitting region 22. In this example, the sizes of the partial regions are identical, and the sizes of the reflection surfaces 21*a* of the prisms 21 are identical.

In this example, the number of the prisms 21 arranged in the partial region 23-1 closest to the light emitting region 22 is n1, the number of the prisms 21 arranged in the partial region 23-2 adjacent to the partial region 23-1 is n2, and the number of the prisms 21 arranged in the partial region 23-3 farthest from the light emitting region 22 is n3. The numbers of prisms included in the partial regions satisfies a relation of n1>n2>n3. As described above, because the sizes of the partial regions are the same and the sizes of the reflection surfaces 21*a* of the prisms are the same, the ratio of the total of the areas of the reflection surfaces 21*a* is enhanced with increasing number of prisms arranged in the partial region, so that the amount of light reflected the observer side also increases in the light from the light source 3. For this reason, the partial region looks brighter with increasing number of prisms arranged in the partial region. Thus, the observer sees the gradation region 23 such that the brightness of the gradation region 23 changes gradually along the array direction of the partial regions 23-1 to 23-3.

Even in the second embodiment, instead of changing the number of prisms according to the light amount, the size of the prism arranged in the partial region may be enlarged with increasing light amount of the partial region.

In the case that the light amount of each partial region is adjusted by the rotation angle of the prism 21, the rotation angle from the directly facing direction may sequentially be increased in each partial region along the direction in which the light amount is decreased in the gradation manner.

In the case that the light amount of each partial region is adjusted by the inclination angle of the reflection surface 21*a* of the prism 21, an amount of angle deviation from a reference inclination angle at which the orientation direction is directed toward the predetermined viewpoint may sequentially be increased in each partial region along the direction in which the light amount is decreased in the gradation manner.

For the light emitting region 22, preferably the light amount of each partial region in the light emitting region 22 is adjusted by the rotation angle of the prism or the inclination angle of the reflection surface of the prism while the light amount of each partial region in the gradation region 23 is adjusted by the ratio of the total of the reflection surface areas of the prisms. Consequently, with the movement of the viewpoint position of the observer, the position where the light emitting region 22 looks bright and the position where the light emitting region 22 looks dark are exchanged, whereas the brightness gradually changes in the gradation region 23 irrespective of the movement of the viewpoint position. This enables the light guide plate 2 to give the more presence to the observer.

As described above, in the display apparatus of the second embodiment, the light emitting region that gives the sparkling feeling and the gradation region where the brightness gradually changes are provided in the light guide plate. In the display apparatus of the second embodiment, the presence of the observer can be further improved by providing the regions that appear differently.

According to a modification of the second embodiment, a light emitting region 22 is not formed in a light guide plate 2, but only a gradation region 23 may be formed. Alternatively, the light emitting region where the brightness is uniformized as viewed from the predetermined viewpoint is provided in the light guide plate 2 so as to be adjacent to the gradation region 23, and the number of prisms arranged in each partial region in the gradation region 23 may be adjusted in the gradation region 23 such that the gradation region 23 becomes dark as the gradation region 23 is away from the light emitting region. In this case, in the light emitting region where the brightness is uniformized as seen from the predetermined viewpoint, for example, a plurality of prisms that reflect the light from a light source 3 toward the predetermined viewpoint may be arranged at substantially the same density over the light emitting region.

According to the modification of each of the above embodiments, the light source 3 may include a plurality of light emitting elements arrayed along a longitudinal direction of the incoming surface 2*a*.

Figure 9:
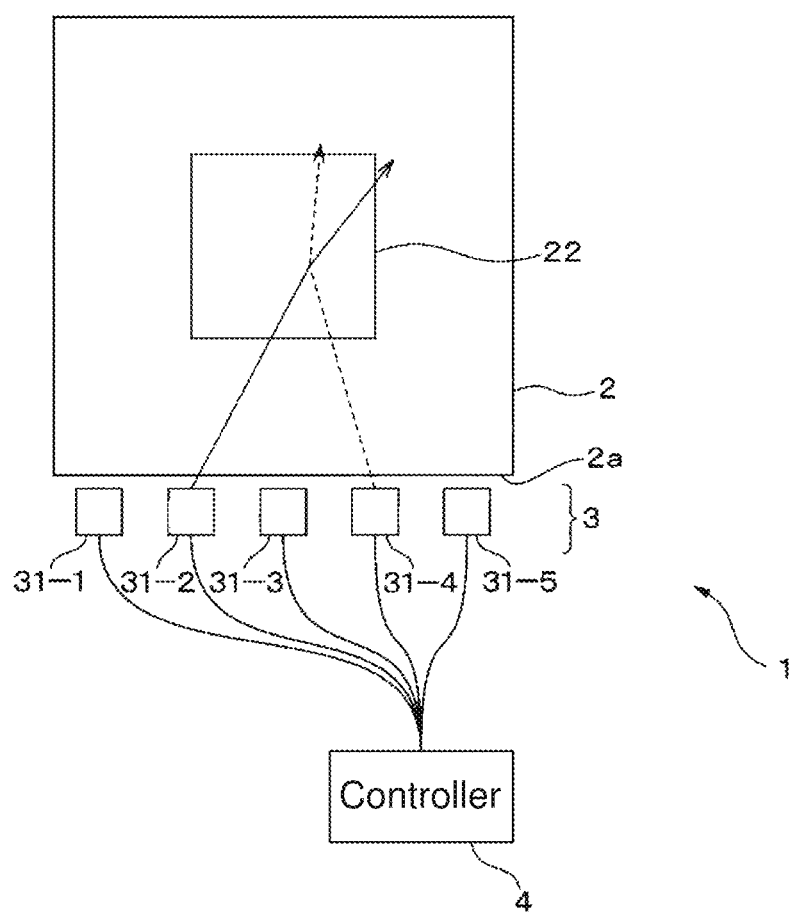
FIG. 9 is a schematic configuration diagram illustrating a display apparatus according to a modification.

FIG. 9 is a schematic configuration diagram illustrating a display apparatus of this modification. In the modification, the light source 3 includes five light emitting elements 31-1 to 31-5 arrayed along the longitudinal direction of the incoming surface 2*a* of the light guide plate 2. The number of light emitting elements included in the light source 3 is not limited to five.

The controller 4 may change the light emitting elements to be lit among the light emitting elements 31-1 to 31-5 with lapse of time. At that point, the controller 4 may change the number of light emitting elements to be lit at the same time with the lapse of time. Consequently, a positional relationship between the light emitting element to be lit among the light emitting elements 31-1 to 31-5 and each prism in the light emitting region 22 also changes, so that a display apparatus 1 can temporally change the light amount of each partial region in the light emitting region 22 even if the observer observes the light emitting region 22 at the same position. This enables the display apparatus 1 to further improve the sparkling feeling given to the observer. In particular, in the case that the light amount of each partial region in the light emitting region 22 is adjusted by at least the rotation angle of the prism, the partial region that becomes bright according to the change of the position of the light emitting element to be lit and the partial region that becomes dark according to the change of the position of the light emitting element to be lit are exchanged, so that the display apparatus 1 can further improve the sparkling feeling given to the observer.

The controller 4 may determine the lighting order of the light emitting elements 31-1 to 31-5 according to lighting order information specifying the lighting order. The lighting order information may be included in a control signal received from the higher-level control apparatus, or previously stored in a memory of the controller 4.

In the case that a plurality of light emitting regions are provided, the rotation angle of the prism in the light emitting region may be adjusted such that only the light emitting region corresponding to the light emitting element is seen shiny when the light emitting element is lit from the specific viewpoint. That is, for each light emitting element, in the corresponding light emitting region, the rotation angle of the prism of each partial region in the light emitting region may be adjusted such that part of the light from the light emitting element is reflected toward the specific viewpoint. In this case, the light from other light emitting elements is reflected toward a direction different from the specific viewpoint by each prism in the light emitting region.

When the plurality of light emitting regions exist, at least parts of two or more light emitting regions may overlap each other. In this case, each prism corresponding to the light emitting region may be arranged into a staggered shape in each light emitting region. In the overlapping region where the light emitting regions overlap each other, the prisms for one light emitting region and the prisms on the other light emitting region may alternately be arranged.

Similarly, a plurality of gradation regions are also provided, and any one of the gradation regions may be associated in each light emitting element.

In the modification, the display apparatus can change the region that gives the sparkling feeling like an animation manner, and resultantly the presence can further be given to the observer.

The display apparatus of each of the embodiments or the modification may be mounted on a game machine such as a pinball game machine or a reel game machine.

Figure 10:
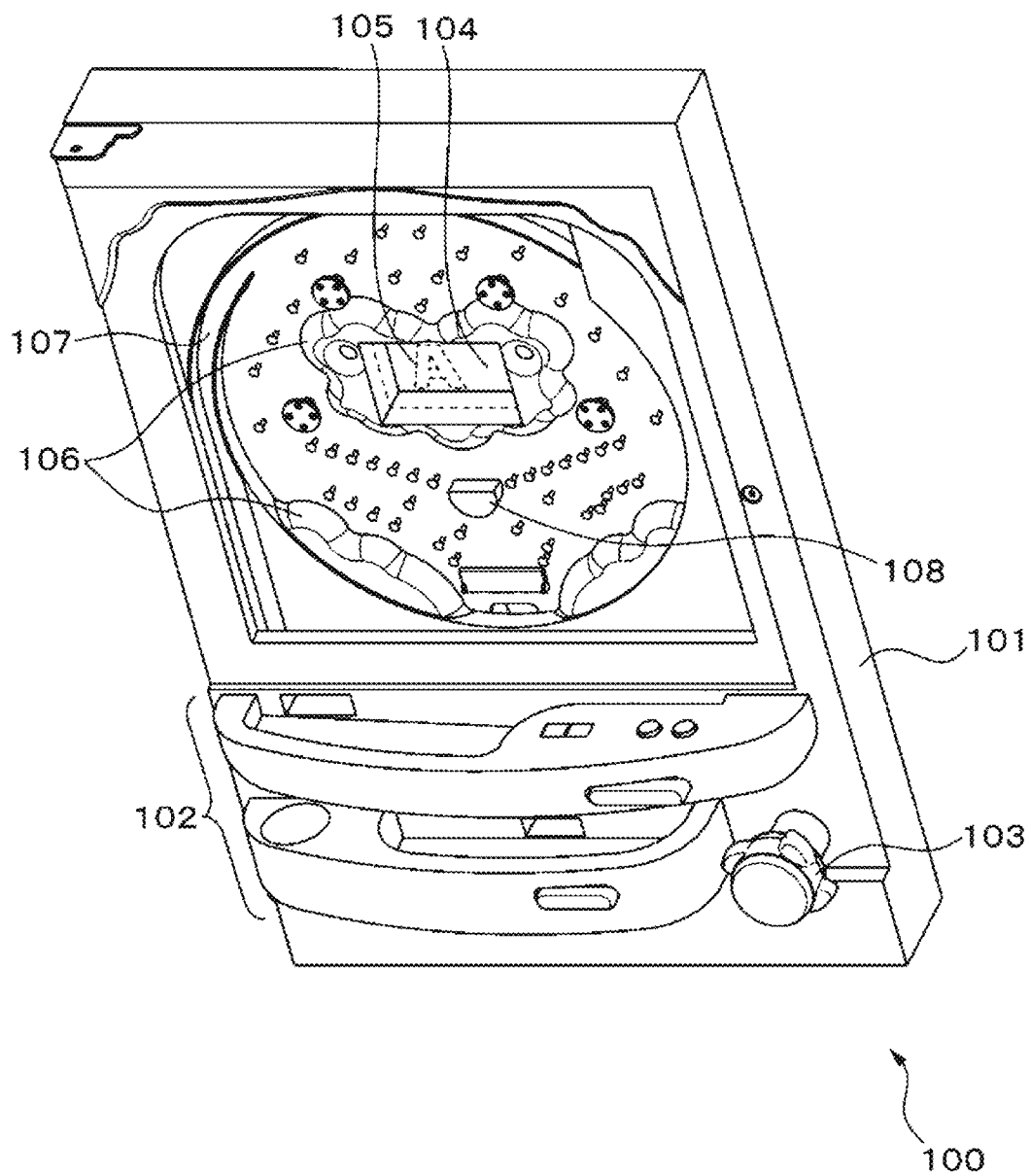
FIG. 10 is a schematic perspective view illustrating a pinball game machine including the display apparatus of each of the embodiments or the modification when the pinball game machine is viewed from a player side.

FIG. 10 is a schematic perspective view illustrating the pinball game machine including the display apparatus of each of the embodiments or the modification when the pinball game machine is viewed from a player side. As illustrated in FIG. 10, a pinball game machine 100 is provided in a most area from an upper portion to a central portion, and includes a game board 101 that is a main body of the game machine, a ball receiving unit 102 provided below the game board 101, an operation unit 103 including a handle, a liquid crystal display 104 provided in the substantial center of the game board 101, and a display apparatus 105 arranged in the front face of the liquid crystal display 104.

The pinball game machine 100 also includes an accessory 106 arranged below the game board 101 or around the display apparatus 105 in the front face of the game board 101 for the purpose of game performance. A rail 107 is disposed on the side of the game board 101. A large number of obstacle nails (not illustrated) and at least one winning apparatus 108 are provided on the game board 101.

The operation unit 103 shoots a game ball with a predetermined force from a launcher (not illustrated) according to a rotation amount of the handle by operation of a player. The shot game ball moves upward along the rail 107, and falls between a large number of obstacle nails. Then, when a sensor (not illustrated) detects that the game ball enters any one of winning apparatuses 108, a main control circuit (not illustrated) provided on the rear surface of the game board 101 dispenses a predetermined number of game balls corresponding to the winning apparatus 108 that the game ball enters to the ball receiving unit 102 through a ball delivery apparatus (not illustrated). The main control circuit drives the liquid crystal display 104 and the display apparatus 105 through a performance CPU (not illustrated) provided on the rear surface of the game board 101.

The display apparatus 105 is an example of the display apparatus of each of the embodiments or the modification, and is attached to the game board 101 such that the outgoing surface of the light guide plate faces the player. Then, the controller of the display apparatus 105 turns on the light source in response to the control signal from the performance CPU according to the state of the game, and the player can visually recognize the pattern giving the sparkling feeling together with video displayed on the liquid crystal display 104. Alternatively, the controller may turn off the light source such that the player can observe only the video displayed on the liquid crystal display 104 through the light guide plate.

Thus, those skilled in the art can make various modifications within the scope of the present invention according to the embodiment to be implemented.

DESCRIPTION OF SYMBOLS 1 display apparatus
2 light guide plate
2a incoming surface
2b diffusion surface
2c outgoing surface
3 light source
21 prism
21a reflection surface
22 light emitting region
22-1 to 22-n partial region
23 gradation region
23-1 to 23-m partial region
4 controller
100 pinball game machine
101 game board
102 ball receiving unit
103 operation unit
104 liquid crystal display
105 display apparatus
106 accessory
107 rail
108 winning apparatus

The invention claimed is:

1. A light guide plate that is transparent to visible light and is formed into a plate shape, the light guide plate comprising:
an incoming surface opposed to a light source that emits the visible light; and
a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate,
wherein an amount of light traveling from each of a plurality of first partial regions in the first region toward a predetermined viewpoint is randomly set such that brightness of the first region changes spatially irregularly as seen from the predetermined viewpoint, and
for each of a plurality of first partial regions in the first region, at least one of a direction of the reflection surface of each prism arranged in the first partial region and a ratio of a total of areas of the reflection surface to the first partial region is set according to an amount of light traveling from the first partial region toward the predetermined viewpoint.

2. The light guide plate according to claim 1, wherein for each of the plurality of first partial regions, an angle along the one surface of the reflection surface with respect to a direction in which the reflection surface of each prism arranged in the first partial region and the light source directly face each other is set so as to become the direction according to the amount of light traveling from the first partial region toward the predetermined viewpoint.

3. The light guide plate according to claim 1, wherein for each of the plurality of first partial regions, an inclination angle of the reflection surface of each prism arranged in the first partial region with respect to the one surface is set so as to become the direction according to the amount of light traveling from the first partial region toward the predetermined viewpoint.

4. The light guide plate according to claim 1, wherein for each of the plurality of first partial regions, a number of prisms arranged in the first partial region is set to the ratio according to the amount of light traveling from the first partial region toward the predetermined viewpoint.

5. The light guide plate according to claim 1, wherein for each of the plurality of first partial regions, a size of the reflection surface of each prism arranged in the first partial region is set to the ratio according to the amount of light traveling from the first partial region toward the predetermined viewpoint.

6. The light guide plate according to claim 1, further comprising a plurality of prisms provided in a second region different from the first region on the one surface of the light guide plate, each of the plurality of prisms including a reflection surface that reflects the visible light, which is emitted from the light source and enters the light guide plate through the incoming surface, toward the other surface of the light guide plate,
wherein for each of a plurality of second partial regions in the second region, at least one of a direction of the reflection surface of each prism arranged in the second partial region and a ratio of a total of areas of the reflection surface to the second partial region is set according to the amount of light traveling from the second partial region toward the predetermined viewpoint such that brightness of the second region changes in a gradation manner along at least one of directions as seen from the predetermined viewpoint.

7. The light guide plate according to claim 6, wherein for each of the plurality of first partial regions, the direction of the reflection surface of each prism arranged in the first partial region is set according to the amount of light traveling from the first partial region toward the predetermined viewpoint, and
for each of the plurality of second partial regions, the ratio of the second partial region is set according to the amount of light traveling from the second partial region toward the predetermined viewpoint.

8. A display apparatus comprising:
a light source configured to emit visible light;
a light guide plate that is transparent to the visible light and is formed into a plate shape; and
a controller configured to control turning on and off of the light source,
wherein the light guide plate includes:
an incoming surface opposed to the light source; and
a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate,
an amount of light traveling from each of a plurality of first partial regions in the first region toward a predetermined viewpoint is randomly set such that brightness of the first region changes spatially irregularly as seen from the predetermined viewpoint, and
for each of a plurality of first partial regions in the first region, at least one of a direction of the reflection surface of each prism arranged in the first partial region and a ratio of a total of areas of the reflection surface to the first partial region is set according to an amount of light traveling from the first partial region toward the predetermined viewpoint.

9. The display apparatus according to claim 8, wherein the light source includes a plurality of light emitting elements arrayed along a longitudinal direction of the incoming surface, and
the controller changes the light emitting element to be lit among the plurality of light emitting elements with lapse of time.

10. The display apparatus according to claim 9, wherein for each of the plurality of first partial regions, an angle along the one surface of the reflection surface of each prism arranged in the first partial region with respect to a predetermined direction along the one surface is set so as to become the direction according to the amount of light traveling from the first partial region toward the predetermined viewpoint.

11. A game machine comprising:
a game machine body; and
a display apparatus provided on a surface of the game machine body on a side opposed to a player,
wherein the display apparatus includes:
a light source configured to emit visible light;
a light guide plate that is transparent to the visible light and is formed into a plate shape; and
a controller configured to control turning on and off of the light source,
the light guide plate includes:
an incoming surface opposed to the light source; and
a plurality of prisms provided in a first region on one of surfaces of the light guide plate, each of the plurality of prisms including a reflection surface that reflects the visible light, which is emitted from the light source and enters the light guide plate through the incoming surface, toward the other surface of the light guide plate, an amount of light traveling from each of a plurality of first partial regions in the first region toward a predetermined viewpoint is randomly set such that brightness of the first region changes spatially irregularly as seen from the predetermined viewpoint, and for each of a plurality of first partial regions in the first region, at least one of a direction of the reflection surface of each prism arranged in the first partial region and a ratio of a total of areas of the reflection surface to the first partial region is set according to an amount of light traveling from the first partial region toward the predetermined viewpoint.

\* \* \* \* \*